3,153,096
PRODUCTION OF CHLORALKYL AMMONIUM CHLORIDES

Hans Soenksen, Hans Stanger, Albert Palm, and Joseph Schmidt, Ludwigshafen (Rhine), Germany, assignors to Badische Anilin- & Soda-Fabrik Aktiengesellschaft, Ludwigshafen (Rhine), Germany
No Drawing. Filed Sept. 8, 1959, Ser. No. 838,387
Claims priority, application Germany Sept. 10, 1958
3 Claims. (Cl. 260—583)

This invention relates to a process for the production of chloralkylammonium chlorides.

It is known to prepare chloralkylamines by the action of chlorinating agents, such as thionyl chloride, phosphorus pentachloride and similar compounds, on alkanolamines. It is also known that chloralkylamines can be obtained from chloralkylphthalimides or by the action of halogen hydracids on phenoxyalkylamines. Bromethyl ammonium bromide is formed on a laboratory scale by the action of aqueous hydrobromic acid on ethanolamine in a bomb tube at elevated temperature. According to the process of U.S. patent specification No. 2,136,171, filed January 4, 1936, halogenalkylamines are obtained by treating salts of alkanolamines with hydrogen halide at temperatures above 100° C. while excluding water from the reaction mixture. According to the said patent specification it is also important for a good success of the reaction that the water formed should be continuously distilled off. The process gives variable yields; in the reaction of ethanolamine the yield is about 90% if account is taken of the fact that the conversion of the last 10 to 20% requires a very long time and correspondingly large amounts of hydrogen chloride. A further disadvantage of the process resides in the fact that the salt melts solidify at about 80° C., and this is undesirable for the discharge of the reaction product and the cleaning of the reaction vessel.

We have now found that chloralkylammonium chlorides are obtained in better yields and in shorter reaction periods by treating a mixture of alkanolamine and water, which contains 40 to 80% by weight, advantageously 50 to 60% by weight, of alkanolamine, at elevated temperature, preferably between 150° and 180° C., under increased pressure and preferably in the presence of a catalyst with such an amount of hydrogen chloride that the amount thereof is more than 40% by weight, preferably between 50 and 70% by weight of the whole reaction mixture.

Alkanolamines suitable for carrying out the process are in general compounds which contain a primary, secondary or tertiary amino group and, in any position relative to this, one or more alcoholic hydroxyl groups. Examples are ethanolamine, diethanolamine, triethanolamine, isopropanolamine, 2-dimethylaminoethanol, 2-methylaminocyclohexanol, 2-phenylethanolamine, 3-aminopropanol, 4-aminobutanol and 4-aminocyclohexanol. It is preferable to use aminoalcohols with a chain length of 2 to 4 carbon atoms.

As catalytically active substances which may be added to the reaction mixture there may be used in general acids having a dehydrating action, for example oxygen-containing inorganic acids, as for example sulfuric acid and phosphoric acid, but also acid salts, such as zinc chloride and aluminum phosphate. They are preferably used in concentrations of 0.1 to 5% by weight.

In general it is preferable to use an amount of hydrogen chloride equal to between 50 and 70% by weight of the said reaction mixture. Obviously higher concentrations are possible, but the pressure then rises considerably. The pressure also depends on the water content of the initial mixture, and is considerable when the water content is low, for example 20%. For this reason it is recommendable to add to the alkanolamine about the same amount of water. Then a large part of the necessary hydrogen chloride can be led in without pressure and nevertheless excellent yields may suprisingly be obtained.

The new process may be carried out for example by placing a mixture of the alkanolamine with water in a pressure vessel, initially leading in and later forcing in hydrogen chloride and heating the mixture, preferably to temperatures between 150° and 180° C. The pressure falls by reason of the consumption of hydrogen chloride and fresh hydrogen chloride is forced in subsequently until the desired content is reached. The reaction requires a few hours and the pressure may amount to up to 100 atmospheres and preferably between 10 and 50 atmospheres.

The mixture is cooled and decompressed. The solution of chloralkylammonium chloride remaining may be evaporated and then yields the solid salt, but by careful addition of a base, the free chloralkylamine may also be recovered. For the production of ethylene imine derivatives, the chloralkylamine is preferably not isolated but subjected at once to the splitting off of hydrogen chloride.

In principle, the reaction may be carried out with comparable good yields without the use of increased pressure provided correspondingly longer reaction periods can be tolerated.

The process according to the invention may also be carried out continuously. For this purpose a solution of an alkanolamine is saturated at room temperature with hydrogen chloride and the mixture allowed to flow slowly through a heated path, such an amount of hydrogen chloride being forced in subsequently that its concentration is between 40 and 70% by weight. After leaving the heated path, the mixture is decompressed. The hydrogen chloride thereby partly set free can be returned to the process, and the solution of chloralkylamine hydrochloride worked up as described above. The reaction periods necessary in the continuous embodiment of the process amount to about half those which are necessary for the discontinuous production.

The following examples will further illustrate this invention but the invention is not restricted to these examples. The parts specified in the examples are parts by weight.

Example 1

Hydrogen chloride is led into a mixture of 427 parts of ethanolamine and 400 parts of water for the formation of the salt. 5 parts of sulfuric acid are added, the mixture is charged into a pressure vessel, an amount of hydrogen chloride is forced in so that a pressure of 40 atmospheres is maintained, and the whole is heated to 170° C. The fall in pressure is made up by subsequent forcing in of hydrogen chloride. In all 883 parts of hydrogen chloride are supplied. The reaction lasts for 10 hours. The pressure vessel is released from pressure and a solution is obtained which contains chlorethylammonium chloride in a yield of 99%.

Example 2

221 parts of hydrogen chloride are led into a mixture of 492 parts of isopropanolamine, 375 parts of water and 5 parts of sulfuric acid. The mixture is transferred to a pressure vessel, heated to 170° C., a further 439 parts of hydrogen chloride forced in and the temperature held for another 4 hours. The pressure is about 15 atmospheres. After cooling and releasing the pressure, a solution is obtained from which 2-chlorpropylammonium chloride is recovered in a yield of 80.7% of the theory by evaporation.

Example 3

74 liters of a mixture containing 25 parts of ethanolamine, 25 parts of water, 42 parts of hydrogen chloride and 0.5 part of sulfuric acid are forced per hour into a high pressure tube. The temperature is 170° C., the pressure 21 atmospheres and the average residence period 240 minutes. The reaction mixture leaving the tube is decompressed and contains chlorethylammonium chloride in almost the quantitative yield. The content of ethanol ammonium chloride in the reaction product is only about 1%.

Example 4

A solution of 975 parts of monoethanolamine hydrochloride (10 mols of ethanolamine and 10 mols of hydrogen chloride) in 100 parts of water is charged into an autoclave and heated up to 170° C. When this temperature has been reached, 40 atmospheres of hydrogen chloride are forced in and the pressure and temperature kept constant for 10 hours. This is effected by continuous replenishment of the consumed hydrogen chloride so that no fall in pressure can occur. By working up the solution, chlorethylammonium chloride is obtained in a yield of 90.4% of the theory.

By prolonging the duration of the process to 20 hours, the yield rises to 97% of the theory.

What we claim is:

1. A process for the production of chloralkylammonium chlorides which comprises treating a mixture of an alkanolamine selected from the group consisting of ethanolamine and isopropanolamine and water which contains from 40 to 80% by weight of the alkanolamine at a temperature of from 150 to 180° C. and at a pressure between 10 and 100 atmospheres with an amount of hydrogen chloride equal to more than 40% by weight of the whole reaction mixture.

2. A process for the production of chloralkylammonium chlorides which comprises: treating a mixture of an alkanolamine selected from the group consisting of ethanolamine and isopropanolamine and water which contains from 40 to 80% by weight of the alkanolamine at a temperature of from 150 to 180° C. and at a pressure between 10 and 100 atmospheres with an amount of hydrogen chloride equal to more than 40% by weight of the whole reaction mixture in the presence of 0.1 to 5% by weight with reference to the whole reaction mixture of a dehydration catalyst selected from the group consisting of sulfuric acid, phosphoric acid, zinc chloride and aluminum phosphate.

3. A process for the production of chloralkylammonium chlorides which comprises: treating a mixture of ethanolamine and water which contains from 40 to 80% by weight of ethanolamine at a temperature of from 150 to 180° C. and at a pressure between 10 and 100 atmospheres with an amount of hydrogen chloride equal to more than 40% by weight of the whole reaction mixture in the presence of 0.1 to 5% by weight with reference to the whole reaction mixture of a dehydration catalyst selected from the group consisting of sulfuric acid, phosphoric acid, zinc chloride and aluminum phosphate.

References Cited in the file of this patent

UNITED STATES PATENTS

| | | |
|---|---|---|
| 2,072,348 | Ward | Mar. 2, 1937 |
| 2,422,957 | Elderfield et al. | June 24, 1947 |

OTHER REFERENCES

Karrer: Organic Chemistry, Elsevier Publishing Co., New York, Second English Edition (1946), pp. 69–70.

Fieser et al.: "Organic Chemistry," pp. 138–139 (2nd ed., 1950).